(12) United States Patent
Lak

(10) Patent No.: US 6,374,618 B1
(45) Date of Patent: Apr. 23, 2002

(54) CRYOGENIC FLUID SUPPLY FROM SUPERCRITICAL STORAGE SYSTEM

(75) Inventor: Tibor Istvan Lak, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/778,545

(22) Filed: Feb. 7, 2001

(51) Int. Cl.[7] ................................................. F17C 7/02
(52) U.S. Cl. ................................................. 62/50.1; 62/7
(58) Field of Search ................................. 62/50.1, 7

(56) References Cited

U.S. PATENT DOCUMENTS

| | | | |
|---|---|---|---|
| 4,292,062 A | * | 9/1981 | Dinulescu et al. ............... 62/7 |
| 4,412,851 A | | 11/1983 | Laine |
| 4,821,907 A | | 4/1989 | Castles et al. |
| 5,127,230 A | * | 7/1992 | Neeser et al. ............... 62/50.1 |
| 5,129,599 A | | 7/1992 | Wollen |
| 5,305,970 A | | 4/1994 | Porter et al. |
| 5,398,515 A | | 3/1995 | Lak |
| 5,564,067 A | | 10/1996 | Hendricks |
| 5,582,016 A | | 12/1996 | Gier et al. |
| 5,644,920 A | | 7/1997 | Lak et al. |
| 5,901,557 A | | 5/1999 | Grayson |

* cited by examiner

Primary Examiner—Ronald Capossela
(74) Attorney, Agent, or Firm—Harness Dickey & Pierce P.L.C.

(57) ABSTRACT

A system for providing cryogenic sub-critical liquid oxygen and liquid hydrogen to storage tanks and payloads contained inside the payload bay of a space vehicle is described. The system provides for transferring cryogenic fluid from a supercritical storage tank to a subcritical storage tank or payload in a zero-g environment, wherein the $H_2$ and $O_2$ ignition hazard has been eliminated due to the low vacuum pressure operating environment. The system includes an external heat exchanger, for example, a parallel flow concentric tube design, and a temperature control system for re-condensing the two-phase transfer fluid expelled from the supercritical storage system into a single phase, sub-cooled cryogenic fluid which is then introduced into and stored within the subcritical storage tank.

20 Claims, 4 Drawing Sheets

CRYOGENIC FLUID SUPPLY FROM SUPERCRITICAL STORAGE SYSTEM

TECHNICAL FIELD

The present invention relates generally to the safe storage and transfer of cryogenic fluids inside the cargo bay of a reusable launch vehicle, and more particularly to cryogenic fluid transfer systems for transferring supercritical cryogenic fluids to subcritical storage tanks in zero gravity environments, thus eliminating potential ignition hazards associated with cryogenic oxygen and hydrogen storage and management through a unique fluid transfer process in a space environment.

BACKGROUND OF THE INVENTION

Cryogenic fluids such as liquid oxygen (LO2) and liquid hydrogen (LH2) are widely used by the aerospace industry as propellants, reactants for power generation, life support systems, sensor cooling, and the like. Although launch vehicles, such as the Space Shuttle, use these cryogens routinely with on-board systems, the storage and handling of these cryogens has been discouraged for payloads due to serious safety issues arising from storage and handling of cryogens inside a closed payload bay compartment. This is due to the fact that reusable launch vehicles (RLV), such as the Space Shuttle, impose unique safety requirements on cryogenic payloads because the payload must be loaded with cryogens on the ground inside a closed compartment, and the RLV must return to the ground with the payload intact in case of an aborted mission. Because the LO2 or LH2 tank is inside a closed cargo bay, serious safety issues arise during loading or after an aborted mission touchdown from small leaks and post landing venting. The concern is that a small amount of hydrogen or oxygen leakage over an extended period of time, e.g., during loading, launch, or post-touchdown, can cause a buildup of hazardous gas concentrations which can result in a fire or catastrophic explosion causing the possible loss of the space vehicle and its crew. Safety issues associated with ignition and explosion can be eliminated if the payload does not have cryogens below altitudes where ignition/explosion can occur. For hydrogen and oxygen the safe altitude where ignition does not occur is above 160,000 ft. At this altitude the atmospheric pressure is too low to support ignition, and therefore hydrogen and oxygen behaves as inert fluids like nitrogen or helium.

Because RLV's, such as the Space Shuttle, contain cryogenic storage tanks for on-board power generation and life support systems, it is possible to transfer hydrogen or oxygen into payloads once the vehicle reaches a safe altitude where ignition hazards are eliminated and where there is sufficient time to completely dump and vacuum inert the payload storage tanks prior to landing. One source of cryogenic fluid is the supercritical storage tanks used to generate electrical power for the Shuttle. The Shuttle's supercritical storage system consists of LO2 and LH2 tanks located in the Orbiter vehicle and also additional storage tanks located on a palette inside the cargo bay referred to as the extended duration orbiter (EDO) tanks. To eliminate liquid acquisition devices that are typically needed in a zero gravity environment, the cryogenic LH2 and LO2 is stored at super critical pressures. Consequently, the fluid is stored as a single phase fluid with no liquid vapor phase. The supercritical pressure is maintained by adding electrical heat to the tank to offset the pressure decay from fluid expulsion. Because the cryogens are stored at supercritical pressures, fluid transfer to a subcritical cannot be done directly.

The cryogenic storage tanks on the EDO pallet are typically tied into (i.e., in fluid communication with) both the fuel cells/life support systems and the pre-existing standard supercritical storage tanks in the orbiter, as shown in the configuration depicted in FIG. 1. The EDO cryogenic fluid storage system 10 typically consists of a tank 12 having a fill port 14 and a vent port 16. A conduit 18 from the vent port 16 branches off into another conduit 20 that leads to a relief valve 22 which in turn leads to a common relief line 24. Conduit 18 also branches off into another conduit 26 which leads to a shutoff valve 28 which in turn leads to a conduit 30 which is in fluid communication with the orbiter cryogenic fluid storage system 32. The orbiter cryogenic fluid storage system 32 typically consists of a tank 34 having a fill port 36 and a vent port 38. A conduit 40 from the vent port 38 leads to a shutoff valve 42 which leads to a conduit loop 44 having a check valve 46 located therein. A conduit 48 from the shutoff valve 42 leads to a vent disconnect assembly 50. Conduit 30 from vent port 16 is in fluid communication with conduit loop 44 and conduit 48. A conduit 52 from fill port 36 leads to shutoff valve 54 which leads to a conduit loop 56 having a check valve 58 located therein. A conduit 60 from the shutoff valve 62 leads to a fill disconnect assembly 62. A conduit 64 from the fill port 14 leads to a shutoff valve 66 which in turn leads to a conduit 68 which is in fluid communication with conduit 60. In order to supply cryogenic fluid to the orbiter's fuel cells and life support systems, it is necessary to provide supply conduits from the two main sources of cryogenic fluid. The EDO cryogenic fluid storage tank 12 is provided with a conduit 70 which leads to a check valve 72 which in turn leads to a conduit 74 which is in fluid communication with the orbiter's fuel cells and life support systems. Likewise, the orbiter cryogenic fluid storage tank 34 is provided with a conduit 76 which leads to a check valve 78 which in turn leads to a conduit 80 (which ties into conduit 74) which is also in fluid communication with the orbiter's fuel cells and life support systems.

Therefore, there is a need for a system that permits the safe and efficient transfer of cryogenic fluids from supercritical storage systems to subcritical storage systems, especially in low g and/or zero-g vacuum environments.

The present invention provides for the safe transfer of LO2 or LH2 from the Space Shuttle supercritical tanks in a low g vacuum environment which enables cryogenic upper stages to be flown in the cargo bay of the Space Shuttle or second generation RLV. The cryogens that can be transferred to a payload cryogenic tank may be used to demonstrate long term cryogenic fluid management, power upper stages, and provide reactants for power generation, cool sensors or electronic equipment.

SUMMARY OF THE INVENTION

It is therefor an object of the present invention to provide a new and improved cryogenic fluid transfer system.

It is another object of the present invention to provide a new and improved cryogenic fluid transfer system for use in zero gravity environments.

It is still another object of the present invention to provide a new and improved cryogenic fluid transfer system for transferring a cryogenic fluid from a supercritical cryogenic fluid storage system to a subcritical cryogenic fluid storage system.

In accordance with one embodiment of the present invention, a cryogenic fluid transfer system for transferring a cryogenic fluid from a supercritical cryogenic fluid storage system is provided, comprising:

a first subcritical cryogenic fluid storage system for receiving the cryogenic fluid from the supercritical cryogenic fluid storage system;

a conduit for providing fluid communication between the supercritical cryogenic fluid storage system and the first subcritical fluid storage system; and a heat exchanger assembly in contact with the conduit, the heat exchanger assembly located downstream of the supercritical cryogenic fluid storage system and upstream of the first subcritical fluid storage system;

wherein the heat exchanger assembly cools the cryogenic fluid expelled from the supercritical cryogenic fluid storage system prior to the cryogenic fluid being introduced into the first subcritical fluid storage system.

In accordance with another embodiment of the present invention, a cryogenic fluid transfer system is provided, comprising:

a supercritical cryogenic fluid storage system;

a first subcritical cryogenic fluid storage system for receiving the cryogenic fluid from the supercritical cryogenic fluid storage system;

a conduit for providing fluid communication between the supercritical cryogenic fluid storage system and the first subcritical fluid storage system;

a heat exchanger assembly in contact with the conduit, the heat exchanger assembly located downstream of the supercritical cryogenic fluid storage system and upstream of the first subcritical fluid storage system;

wherein the heat exchanger assembly cools the cryogenic fluid expelled from the supercritical cryogenic fluid storage system prior to the cryogenic fluid being introduced into the first subcritical fluid storage system; and a source of pressurized inert gas in fluid communication with the first subcritical fluid storage system, wherein the source of pressurized gas permits the pressurization of the first subcritical cryogenic fluid storage system.

In accordance with still another embodiment of the present invention, a cryogenic fluid transfer system is provided, comprising:

a supercritical cryogenic fluid storage system;

a first subcritical cryogenic fluid storage system for receiving the cryogenic fluid from the supercritical cryogenic fluid storage system;

a second subcritical fluid storage system for receiving the cryogenic fluid from the supercritical cryogenic fluid storage system or the first subcritical cryogenic fluid storage system;

a conduit for providing fluid communication among the supercritical cryogenic fluid storage system and the first and second subcritical fluid storage systems;

a heat exchanger assembly in contact with the conduit, the heat exchanger assembly located downstream of the supercritical cryogenic fluid storage system and upstream of the first and second subcritical fluid storage systems;

wherein the heat exchanger assembly cools the cryogenic fluid expelled from the supercritical cryogenic fluid storage system prior to the cryogenic fluid being introduced into the first or second subcritical fluid storage systems;

a source of pressurized inert gas in fluid communication with the first and second subcritical fluid storage systems, wherein the source of pressurized gas permits the pressurization of the first and second subcritical cryogenic fluid storage systems; and a gaseous fluid source in fluid communication with the first and second subcritical fluid storage systems and the supercritical cryogenic fluid storage system.

Additional objects, advantages, and features of the present invention will become apparent from the following description and appended claims, taken in conjunction with the accompanying drawings.

BRIEF DESCRIPTION OF THE DRAWINGS

The various advantages of the present invention will become apparent to one skilled in the art by reading the following specification and subjoined claims and by referencing the following drawings in which:

FIG. 4 is perspective view of an extended duration orbiter pallet system in proximity to an alternative embodiment of a cryogenic fluid transfer system, in accordance with one aspect of the present invention.

The same reference numerals refer to the same parts throughout the various Figures.

DETAILED DESCRIPTION OF THE PREFERRED EMBODIMENTS

The following discussion of the preferred embodiments directed to cryogenic fluid transfer systems for transferring supercritical cryogenic fluids to subcritical storage tanks or payloads in zero gravity environments are merely exemplary in nature, and are in no way intended to limit the invention or its applications or uses.

A first embodiment of the present invention includes a cryogenic fluid transfer system which is able to transfer a cryogenic fluid from a supercritical cryogenic fluid storage system to a subcritical cryogenic fluid storage system. The cryogenic fluid transfer system includes three basic components: a storage tank, a pressurization tank, and a heat exchanger, the function of all of which will be explained herein. Additional components such as conduits, valves, check valves, regulators, orifices, pumps, diffusers, as well as other auxiliary components not specifically mentioned or discussed, enable the cryogenic fluid transfer system of the present invention to function properly.

Figure 1:
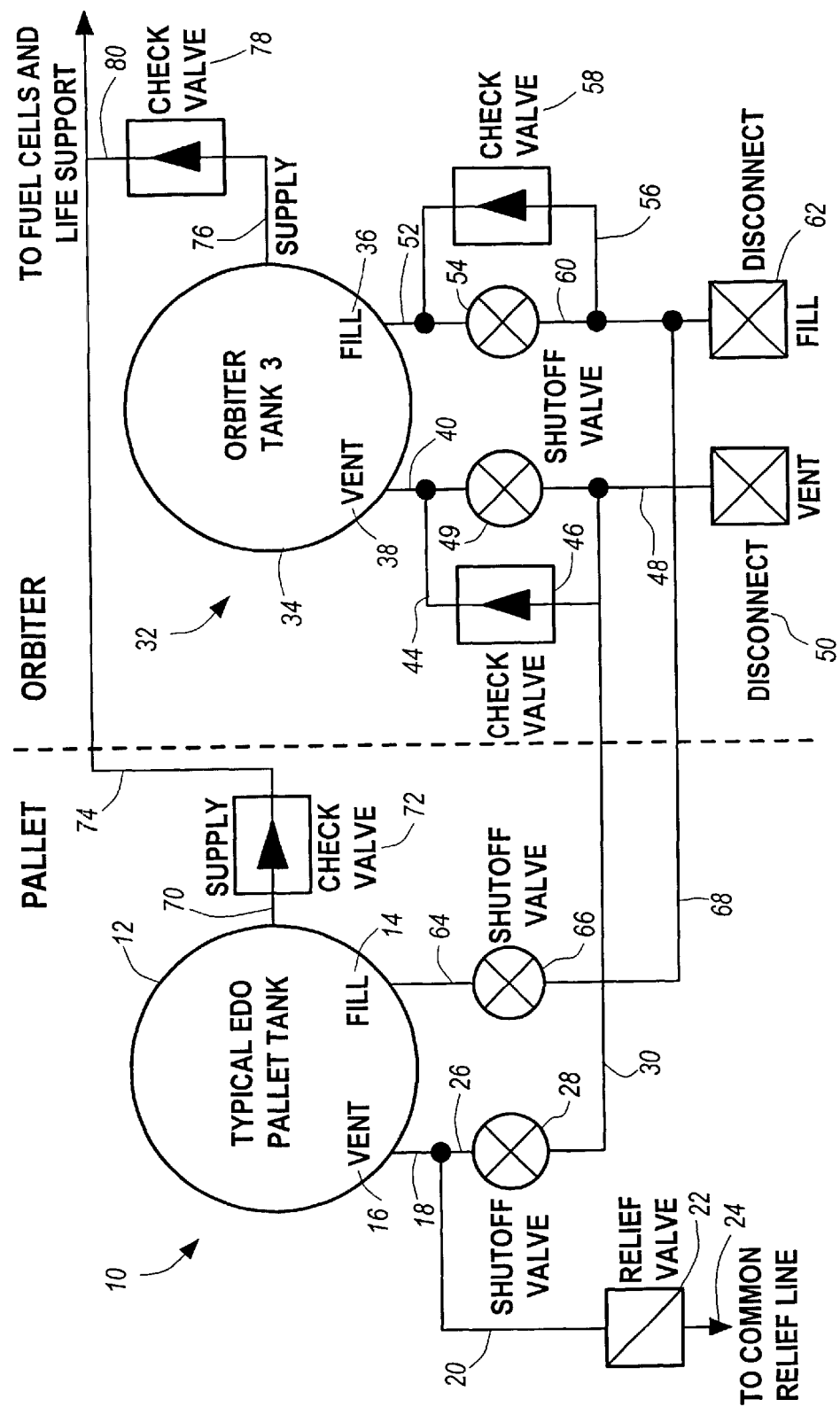
FIG. 1 is schematic illustration of the fluid communication configuration of an extended duration orbiter pallet cryogenic fluid storage tank with the orbiter cryogenic storage tank and the orbiter fuel cell/life support systems, in accordance with the prior art.
Figure 2:
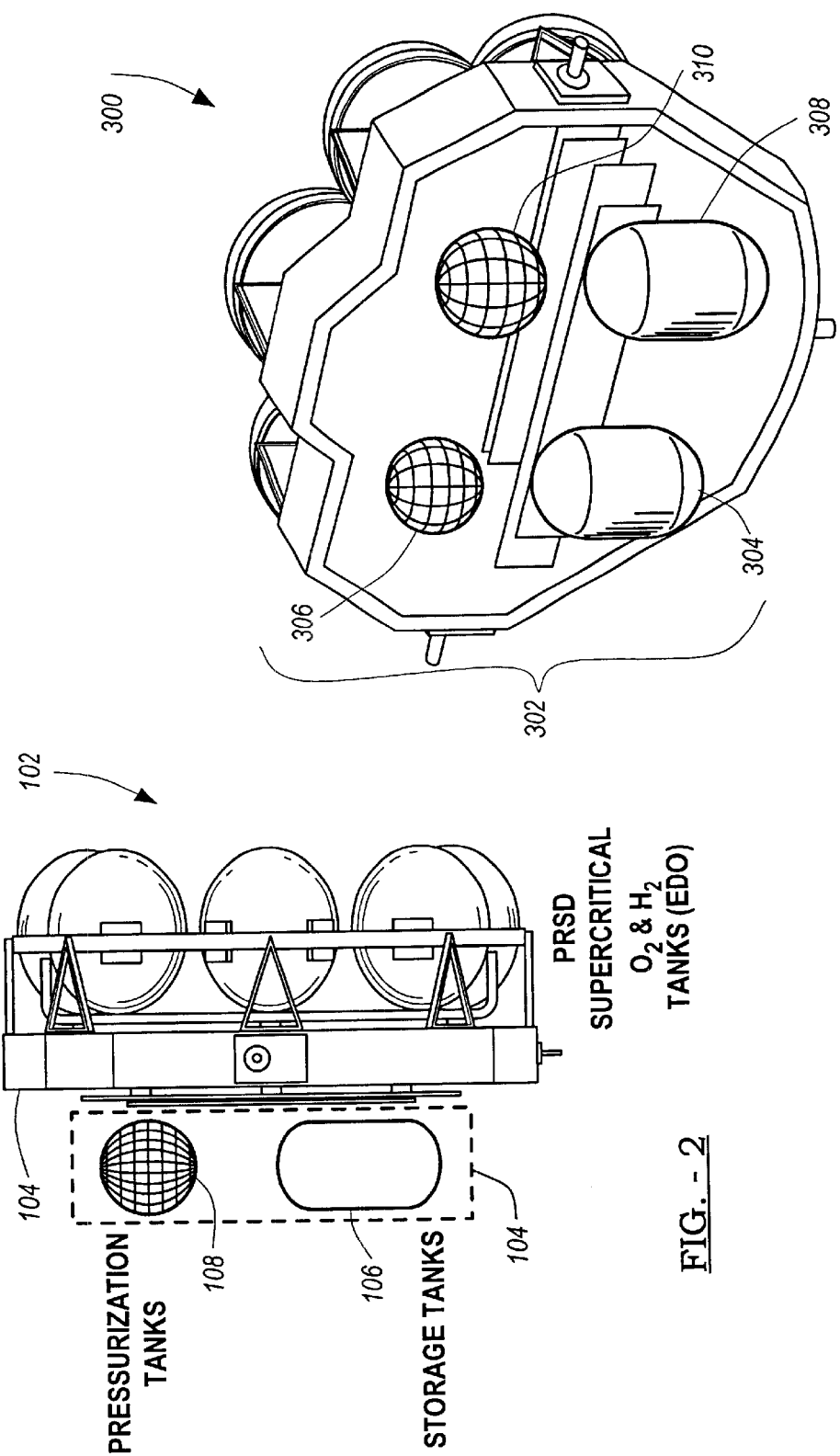
FIG. 2 is partially broken away side elevational view of an extended duration orbiter pallet system in proximity to a payload tank containing two primary components of a cryogenic fluid transfer system, in accordance with one aspect of the present invention.

Referring to FIG. 2, there is shown an intended placement of the cryogenic fluid transfer system 100 of the present invention in proximity to the supercritical cryogenic fluid storage system 102 of the extended duration orbiter pallet 104. It will be noted that the cryogenic fluid transfer system 100 of the present invention is depicted as being housed within a payload tank 104 (e.g., a satellite); however, it should be noted that the cryogenic fluid transfer system 100 of the present invention is not required to be contained within any type of structure. In this view, the cryogenic storage tank 106 and the pressurization tank 108 of the cryogenic fluid transfer system 100 of the present invention are clearly shown.

Figure 3:
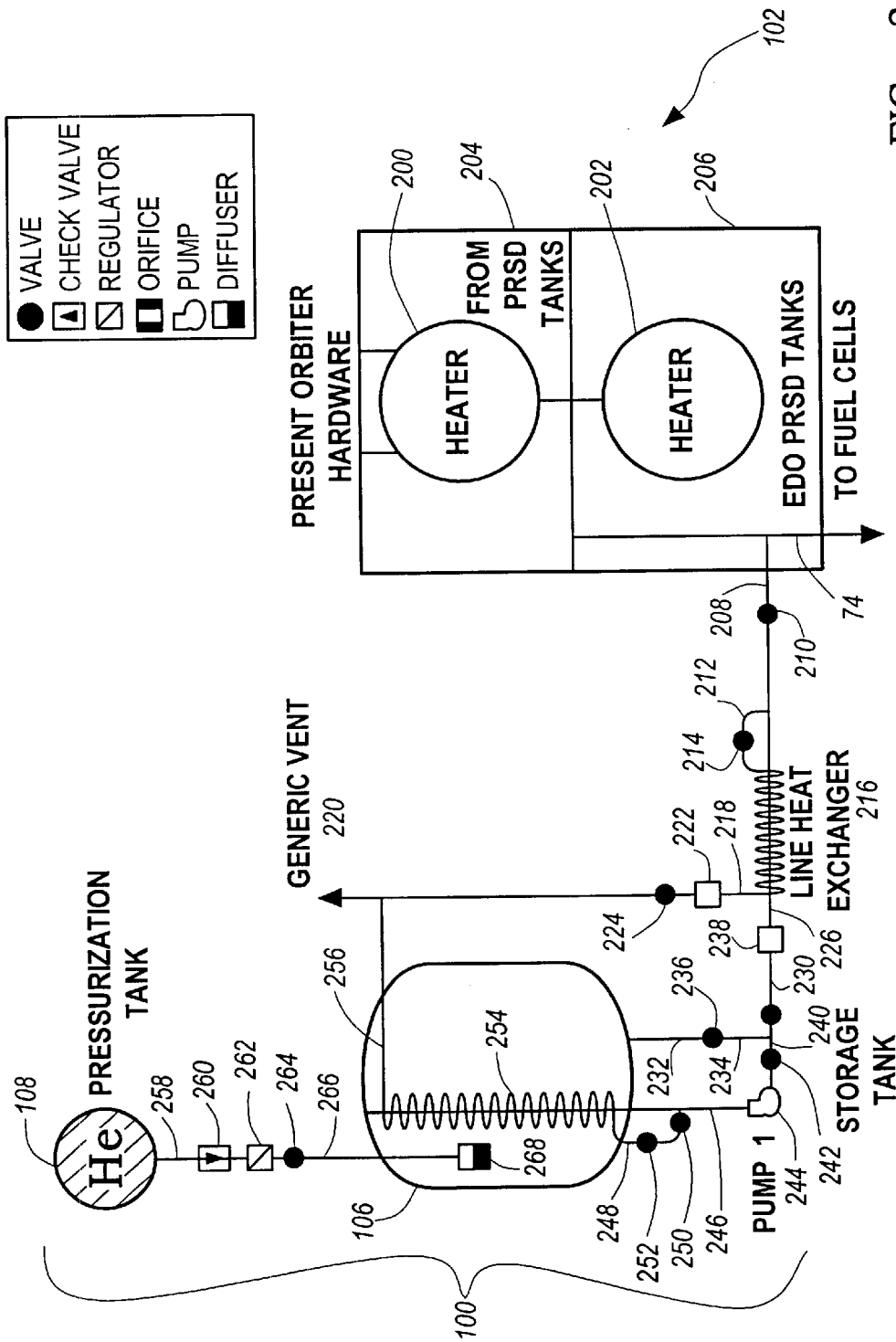
FIG. 3 is schematic illustration of the fluid communication configuration of a cryogenic fluid transfer system of the present invention with the extended duration orbiter pallet cryogenic fluid storage tank/orbiter cryogenic storage tank system, in accordance with one aspect of the present invention.

Referring to FIG. 3, there is shown a schematic illustration of the fluid communication configuration of the cryogenic fluid transfer system 100 of the present invention with the extended duration orbiter pallet cryogenic fluid storage tank/orbiter cryogenic storage tank system 102, in accordance with one aspect of the present invention. It should be noted that this illustrative configuration may be significantly modified or altered without departing from the scope of the present invention.

Electrical heaters 200, 202, respectively, are installed in the EDO and pre-existing standard supercritical fluid storage tanks 204, 206, respectively, to maintain a supercritical pressure during the cryogenic fluid expulsion and transfer processes. In this illustrative illustration, a conduit 208 coming off from the main supply conduit 74 to the fuel cells and life support systems leads to a valve 210.

After valve 210, there is a conduit loop 212 containing an orifice 214. After the conduit loop 212, there is a line heat exchanger 216 in contact with the conduit portion downstream of the conduit loop 212. Heat exchanger 216 (which can be a parallel flow concentric tube design, or other type of conventional heat exchanger) subcools the two-phase cryogenic fluid into a single phase cryogenic fluid. At the terminal portion of heat exchanger 216 furthest downstream of the extended duration orbiter pallet cryogenic fluid storage tank/orbiter cryogenic storage tank system 102, there is a side conduit 218 leading to a generic vent 220. Disposed on side conduit 218 is an orifice 222 and a valve 224. Downstream of heat exchanger 216 is a conduit 226 which leads to an orifice 228 which is turns leads to a valve 230, which is turn leads to a T-shaped conduit junction 232.

A side conduit 234 leads to a valve 236 which leads to a conduit 238 that is in fluid communication with subcritical cryogenic fluid storage tank 106. Downstream of T-shaped conduit junction 232 is a conduit 240 which leads to a valve 242 which in turn leads to a pump 244. A conduit 246 from pump 244 is in fluid communication with subcritical cryogenic fluid storage tank 106. A conduit loop 248 is disposed in conduit 246. A valve 250 and orifice 252 are disposed within conduit loop 248. Conduit 246 is surrounded by a temperature control assembly 254 (e.g., a heat exchanger) located inside of subcritical cryogenic fluid storage tank 106. The top portion of temperature control assembly 254 includes a conduit 256 leading to the generic vent 220.

Pressurization tank 108 (containing an inert gas such as helium) is also in fluid communication with subcritical cryogenic fluid storage tank 106. A conduit 258 which leads to a check valve 260 which leads to a regulator 262 which leads to a valve 264 which leads to another conduit 266 which terminates inside subcritical cryogenic fluid storage tank 106. At the terminus of conduit 266 there is located a diffuser 268.

In operation, the space vehicle's subcritical storage tanks or payload tanks, as the case may be, are typically located in the payload bay of the space vehicle, and are pressurized with low pressure helium on the ground, i.e., prior to launch.

Once the space vehicle is safely in orbit, the payload bay doors are opened and the helium contained within the subcritical storage tank is vented to the atmosphere. There is now a safe environment to transfer liquid hydrogen and oxygen from the existing onboard supercritical cryogenic hydrogen/oxygen supply or the EDO pallet. Once the payload bay doors are opened it is safe to transfer the cryogenic hydrogen/oxygen from the EDO pallet's supercritical cryogenic fluid storage tanks to the subcritical cryogenic payload.

After venting the tank pressure, the subcritical cryogenic fluid storage tank is initially chilled using a spraybar/heat exchanger assembly as described in U.S. Pat. No. 5,398,515. The chilidown continues until the vent temperature or the tank wall temperature is appropriate. A series of valves are used to control the flow of the supercritical cryogenic fluid from the supercritical cryogenic fluid storage tanks to the subcritical cryogenic fluid storage tanks.

Once the subcritical cryogenic fluid storage tank is sufficiently chilled, the cryogenic fluid flows from the supercritical tank, by opening any number of appropriate valves (at this point the single phase supercritical cryogenic fluid becomes a two phase subcritical cryogenic fluid), and passes through a heat exchanger, which subcools the cryogenic fluid so that it recondenses into a single phase cryogenic fluid. The single phase, subcooled cryogenic fluid is then spray injected into the subcritical cryogenic fluid storage tank. A vapor-cooled shield inside the subcritical cryogenic fluid storage tank continues to receive subcooled cryogenic fluid from the heat exchanger. The subcooled cryogenic fluid wraps around the walls of the subcritical cryogenic fluid storage tank to continue the cooling process. Details concerning the spray bar and the vapor shield are also described in U.S. Pat. No. 5,398,515. This process subcools the cryogenic fluids from the supercritical cryogenic fluid storage tank and maintains a very low temperature cryogenic fluid in the subcritical cryogenic fluid storage tank. Flow of the cryogenic fluid continues until a desired level is reached in the subcritical cryogenic fluid storage tank.

During the time when the cryogenic fluid is transferred from the supercritical cryogenic fluid storage tank to the subcritical cryogenic fluid storage tank, a small fraction of the cryogenic fluid is vented through an appropriate valve and sent overboard through a vapor cooled shield flow control orifice and vent line.

The pressurization tank is used to pressurize the subcritical cryogenic fluid storage tank to the operating pressure. The pressurant (e.g., helium gas) comes from the pressurization tank through a regulator and isolation valve and then in through an internal diffuser.

Referring to FIG. 4, there is shown a perspective view of an extended duration orbiter pallet system 300 in proximity to an alternative embodiment of a cryogenic fluid transfer system 302, in accordance with one aspect of the present invention. In this view, the subcritical cryogenic fluid storage tank 304 and pressurization tank 306 are supplemented with an additional subcritical cryogenic fluid storage tank 308 (also referred to as a receiver tank) as well as a gaseous fluid storage tank 310 (e.g., hydrogen or oxygen), both of which are in fluid communication with all of the major components of the cryogenic fluid transfer system 302.

Figure 5:
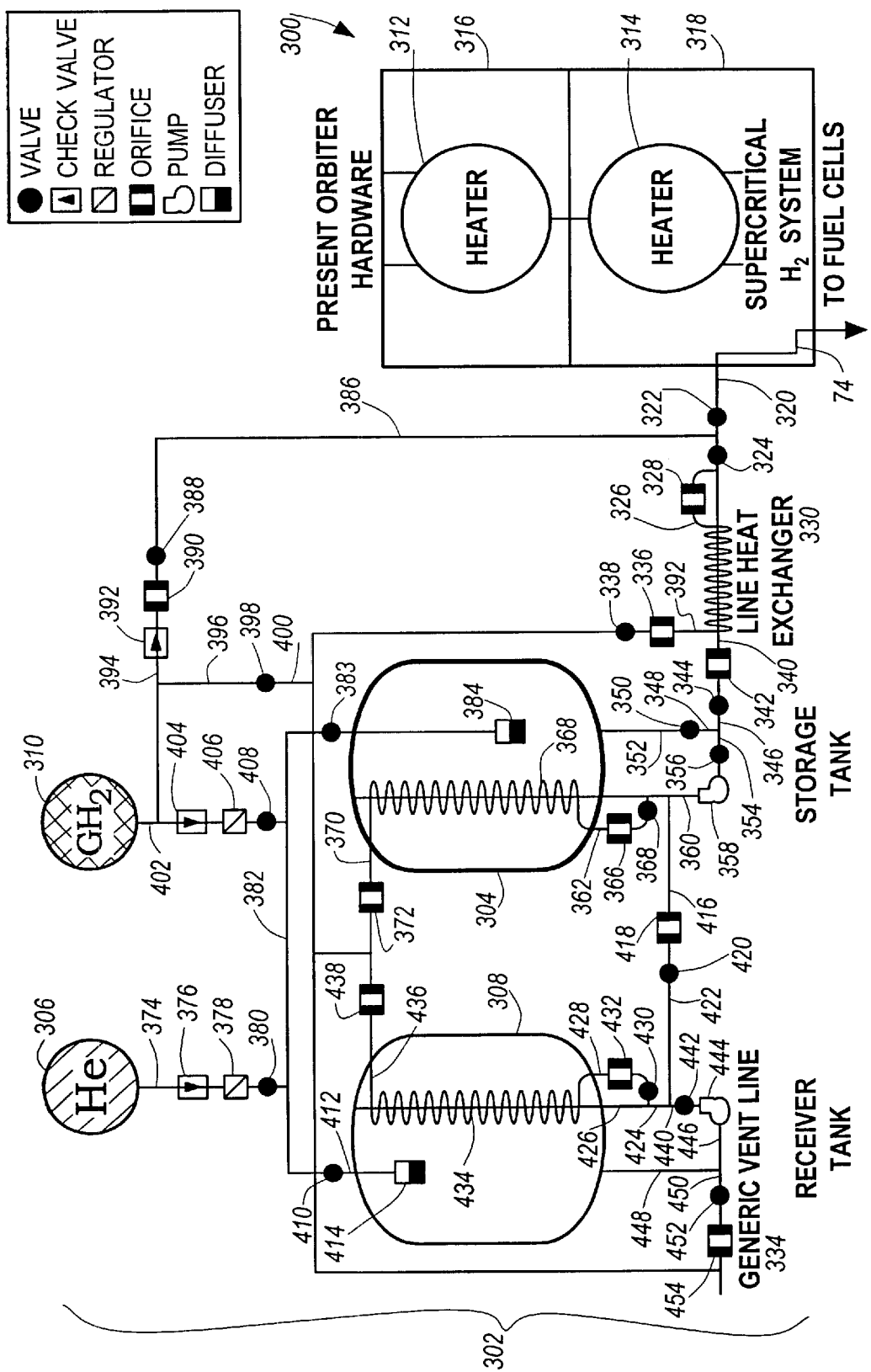
FIG. 5 is schematic illustration of the fluid communication configuration of an alternative embodiment of a cryogenic fluid transfer system of the present invention and the extended duration orbiter pallet cryogenic fluid storage tank/orbiter cryogenic storage tank system, in accordance with one aspect of the present invention.

Referring to FIG. 5, there is shown a schematic illustration of the fluid communication configuration of an alternative embodiment of a cryogenic fluid transfer system 302 of the present invention and the extended duration orbiter pallet cryogenic fluid storage tank/orbiter cryogenic storage tank system 300, in accordance with one aspect of the present invention. It should be noted that this illustrative configuration may be significantly modified or altered without departing from the scope of the present invention.

Electrical heaters 312, 314, respectively, are installed in the EDO and pre-existing standard supercritical fluid storage tanks 316, 318, respectively, to maintain a supercritical pressure during the cryogenic fluid expulsion and transfer processes. In this illustrative illustration, a conduit 320 coming off from the main supply conduit 74 to the fuel cells and life support systems leads to a set of two valves 322, 324, respectively.

After the second valve 324, there is a conduit loop 326 containing an orifice 328. After conduit loop 326, there is a line heat exchanger 330 in contact with the conduit portion downstream of the conduit loop 326. Heat exchanger 330 (which can be a parallel flow concentric tube design) subcools the two-phase cryogenic fluid into a single phase cryogenic fluid. At the terminal portion of heat exchanger 330 furthest downstream of the extended duration orbiter pallet cryogenic fluid storage tank/orbiter cryogenic storage tank system 300, there is a side conduit 332 leading to a generic vent 334. Disposed on side conduit 332 is an orifice 336 and a valve 338.

Downstream of heat exchanger 330 is a conduit 340 which leads to an orifice 342 which is turns leads to a valve 344, which is turn leads to a T-shaped conduit junction 346. A side conduit 348 leads to a valve 350 which leads to a conduit 352 that is in fluid communication with subcritical cryogenic fluid storage tank 304.

Downstream of the T-shaped conduit junction 346 is a conduit 354 which leads to a valve 356 which in turn leads to a pump 358. A conduit 360 from the pump 358 is in fluid communication with subcritical cryogenic fluid storage tank 304. A conduit loop 362 having a valve 364 and an orifice 366 are disposed in conduit loop 362. Conduit 360 is surrounded by a temperature control assembly 368 (e.g., a heat exchanger) located inside of subcritical cryogenic fluid storage tank 304. The top portion of temperature control assembly 368 includes a conduit 370 having a valve 372 which eventually leads to generic vent 334.

Pressurization tank 306 (containing an inert gas such as helium) is also in fluid communication with subcritical cryogenic fluid storage tank 304. A conduit 374 which leads to a check valve 376 which leads to a regulator 378 which leads to a valve 380 which leads to another conduit 382 (which leads to valve 383) which terminates inside subcritical cryogenic fluid storage tank 304. At the terminus of the conduit 382 there is located a diffuser 384.

The cryogenic fluid receiver tank 308 is also in fluid communication with cryogenic fluid storage tank 304, as well as pressurization tank 306 and gaseous fluid tank 310. A conduit 386 from conduit 320 leads to a valve 388 which leads to an orifice 390 which in turn leads to a check valve 392. A conduit 394 from check valve 392 branches into a conduit 396 which leads to a valve 398 which leads to a conduit 400 which in turn leads to conduit 332.

The other branch of conduit 394 leads to a conduit 402 which is in fluid communication with gaseous fluid storage system 310. Downstream of conduit 402 is a check valve 404 which leads to a regulator 406 which in turn leads to a valve 408 which eventually leads to conduit 382. Conduit 382 then leads to valve 410 which leads to conduit 412 which terminates inside the cryogenic fluid receiver tank 308. At the terminus of conduit 412 there is located a diffuser 414.

A side conduit 416 from conduit 360 leads to an orifice 418 which leads to a valve 420 which leads to a conduit 422. Conduit 422 leads to a T-shaped conduit junction 424. A conduit 426 is in fluid communication with the subcritical cryogenic fluid receiver tank 308. A conduit loop 428 having a valve 430 and an orifice 432 are disposed in conduit loop 428. Conduit 426 is surrounded by a temperature control assembly 434 (e.g., a heat exchanger) located inside of subcritical cryogenic fluid receiver tank 308. The top portion of temperature control assembly 434 includes a conduit 436 having a valve 438 which eventually leads to generic vent 334.

On the other side of T-shaped conduit junction 424 there is a conduit 440 having a valve 442 leading to a pump 444. A T-shaped conduit junction 446 branches off into a conduit 448 which is in direct fluid communication with subcritical cryogenic fluid receiver tank 308. The other branch of T-shaped conduit junction 446 leads to a conduit 450 which leads to a valve 452 which leads to an orifice 454 which eventually leads to generic vent 334.

The operation of the alternative embodiment of the cryogenic fluid transfer system 302 of the present invention is similar to the first embodiment, with the difference lying in the fact that a greater number of transfer options and scenarios are available. For example, the use of two subcritical cryogenic fluid storage tanks allows for one or both tanks to be alternatively filled and/or vented, depending on the space vehicle's particular needs. Additionally, the use of a pressurization tank and a gaseous fluid storage tank, both being in fluid communication with both of the subcritical cryogenic fluid storage tanks, as well as the supercritical cryogenic fluid storage system, allows for greater flexibility and versatility regarding filling and venting operations.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A cryogenic fluid transfer system for transferring a cryogenic fluid from a supercritical cryogenic fluid storage system, comprising:
   a first subcritical cryogenic fluid storage system for receiving the cryogenic fluid from the supercritical cryogenic fluid storage system;
   a conduit for providing fluid communication between the supercritical cryogenic fluid storage system and the first subcritical fluid storage system; and
   a heat exchanger assembly in contact with the conduit, the heat exchanger assembly located downstream of the supercritical cryogenic fluid storage system and upstream of the first subcritical fluid storage system;
   wherein the heat exchanger assembly cools the cryogenic fluid expelled from the supercritical cryogenic fluid storage system prior to the cryogenic fluid being introduced into the first subcritical fluid storage system.

2. The invention according to claim 1, further comprising a second subcritical fluid storage system in fluid communication with the first subcritical cryogenic fluid storage system and the supercritical cryogenic fluid storage system.

3. The invention according to claim 2, wherein the first and second subcritical cryogenic fluid storage systems include an internal temperature control assembly and an internal fluid distribution assembly.

4. The invention according to claim 2, further comprising a gaseous fluid source in fluid communication with the first and second subcritical fluid storage systems and the supercritical cryogenic fluid storage system.

5. The invention according to claim 4, wherein the gaseous fluid is selected from the group consisting of oxygen, hydrogen, and combinations thereof.

6. The invention according to claim 4, further comprising a source of pressurized inert gas in fluid communication with the first and second subcritical fluid storage systems, wherein the source of pressurized gas permits the pressurization of the first and second subcritical cryogenic fluid storage systems.

7. The invention according to claim 6, wherein the inert gas is helium.

8. The invention according to claim 1, wherein the cryogenic fluid is selected from the group consisting of oxygen, hydrogen, and combinations thereof.

9. A cryogenic fluid transfer system, comprising:
   a supercritical cryogenic fluid storage system;
   a first subcritical cryogenic fluid storage system for receiving the cryogenic fluid from the supercritical cryogenic fluid storage system;
   a conduit for providing fluid communication between the supercritical cryogenic fluid storage system and the first subcritical fluid storage system;
   a heat exchanger assembly in contact with the conduit, the heat exchanger assembly located downstream of the supercritical cryogenic fluid storage system and upstream of the first subcritical fluid storage system;
   wherein the heat exchanger assembly cools the cryogenic fluid expelled from the supercritical cryogenic fluid storage system prior to the cryogenic fluid being introduced into the first subcritical fluid storage system; and
   a source of pressurized inert gas in fluid communication with the first subcritical fluid storage system, wherein the source of pressurized gas permits the pressurization of the first subcritical cryogenic fluid storage system.

10. The invention according to claim 9, further comprising a second subcritical fluid storage system for receiving the cryogenic fluid from the supercritical cryogenic fluid storage system or the first subcritical cryogenic fluid storage system, the second subcritical fluid storage system being in fluid communication with the first subcritical cryogenic fluid storage system, the supercritical cryogenic fluid storage system and the source of pressurized inert gas.

11. The invention according to claim 10, wherein the first and second subcritical cryogenic fluid storage systems include an internal temperature control assembly and an internal fluid distribution assembly.

12. The invention according to claim 10, further comprising a gaseous fluid source in fluid communication with the first and second subcritical fluid storage systems and the supercritical cryogenic fluid storage system.

13. The invention according to claim 12, wherein the gaseous fluid is selected from the group consisting of oxygen, hydrogen, and combinations thereof.

14. The invention according to claim 9, wherein the inert gas is helium.

15. The invention according to claim 9, wherein the cryogenic fluid is selected from the group consisting of oxygen, hydrogen, and combinations thereof.

16. A cryogenic fluid transfer system, comprising:
   a supercritical cryogenic fluid storage system;
   a first subcritical cryogenic fluid storage system for receiving the cryogenic fluid from the supercritical cryogenic fluid storage system;
   a second subcritical fluid storage system for receiving the cryogenic fluid from the supercritical cryogenic fluid storage system or the first subcritical cryogenic fluid storage system;
   a conduit for providing fluid communication among the supercritical cryogenic fluid storage system and the first and second subcritical fluid storage systems;
   a heat exchanger assembly in contact with the conduit, the heat exchanger assembly located downstream of the supercritical cryogenic fluid storage system and upstream of the first and second subcritical fluid storage systems;
   wherein the heat exchanger assembly cools the cryogenic fluid expelled from the supercritical cryogenic fluid storage system prior to the cryogenic fluid being introduced into the first or second subcritical fluid storage systems;
   a source of pressurized inert gas in fluid communication with the first and second subcritical fluid storage systems, wherein the source of pressurized gas permits the pressurization of the first and second subcritical cryogenic fluid storage systems; and
   a gaseous fluid source in fluid communication with the first and second subcritical fluid storage systems and the supercritical cryogenic fluid storage system.

17. The invention according to claim 16, wherein the first and second subcritical cryogenic fluid storage systems include an internal temperature control assembly and an internal fluid distribution assembly.

18. The invention according to claim 16, wherein the gaseous fluid is selected from the group consisting of oxygen, hydrogen, and combinations thereof.

19. The invention according to claim 16, wherein the inert gas is helium.

20. The invention according to claim 16, wherein the cryogenic fluid is selected from the group consisting of oxygen, hydrogen, and combinations thereof.

* * * * *